2,555,589

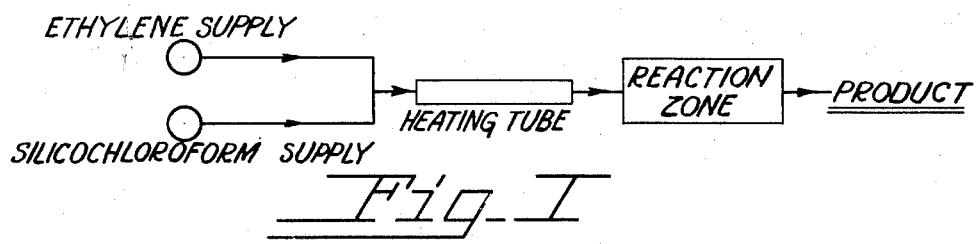
Fig. I
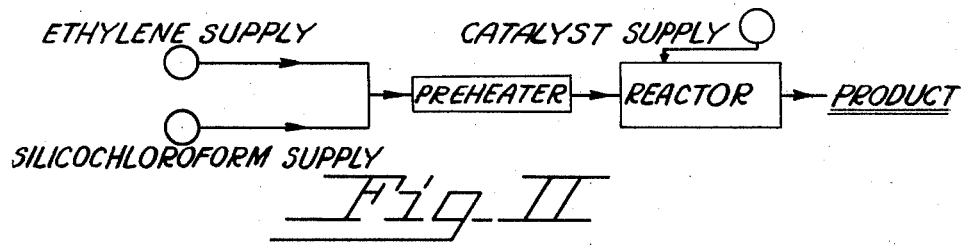
Fig. II
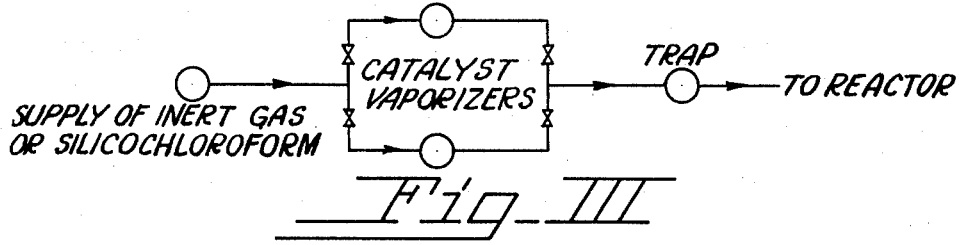
Fig. III
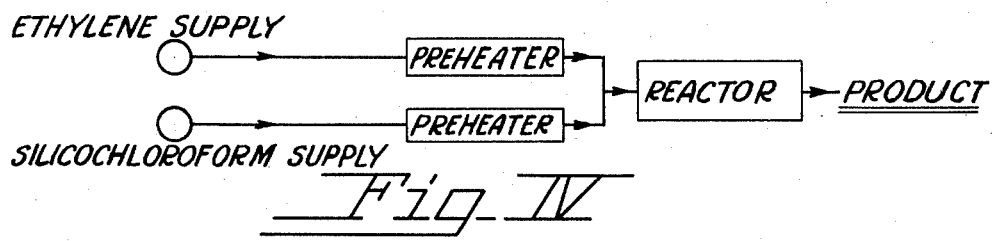
Fig. IV
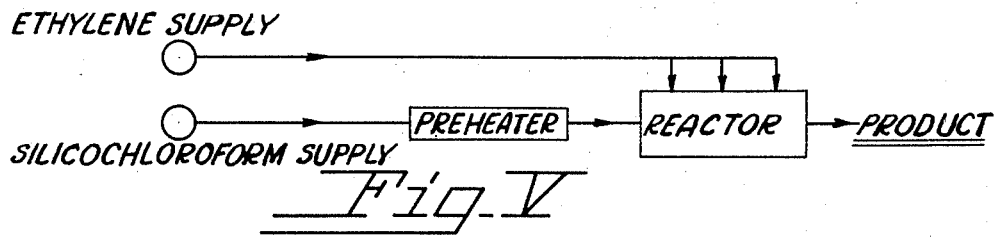
Fig. V Patented June 5, 1951

UNITED STATES PATENT OFFICE 2,555,589

PRODUCTION OF POLY-(ALKYL-SUBSTITUTED)-SILANES

David B. Hatcher, Toledo, Ohio, assignor to Libbey-Owens-Ford Glass Company, Toledo, Ohio, a corporation of Ohio Application January 31, 1948, Serial No. 5,680

4 Claims. (Cl. 260—448.2)

The invention relates to an improved method of producing silanes having more than one alkyl radical in the molecule.

It has been known that a halosilane whose molecule contains a hydrogen atom connected directly to the silicon atom can be reacted with an olefin to convert such hydrogen atom into an alkyl radical. However, no method has been known for introducing in a single step more than one alkyl radical for each hydrogen atom which was connected directly to the silicon atom in the molecule of the silane used as the starting material.

The principal object of the invention is the production of silanes having more than one alkyl radical in the molecule by reaction of an olefin with a halosilane whose molecule contains only one hydrogen atom connected directly to the silicon atom. More specific objects and advantages are apparent from the description, in which reference is had to the accompanying drawings illustrating preferred embodiments of the invention.

Figure I of the drawings is a flow diagram illustrating a process by which the reaction of the invention is conducted continuously, namely the method wherein ethylene and silicochloroform are mixed and the mixture is admitted to a heating tube where it is heated rapidly, and from which it is passed to a reaction zone.

Figure II is a flow diagram illustrating a second process by which the reaction of the invention is conducted continuously, namely the method wherein ethylene and silicochloroform are mixed and the mixture is admitted to a preheater, from which it is passed to a reactor to which a catalyst is added.

Figure III is a flow diagram illustrating a method by which a catalyst may be admitted to the reactor.

Figure IV is a flow diagram illustrating a third process by which the reaction of the invention is conducted continuously, namely the method wherein ethylene is passed through a preheater and mixed with silicochloroform that has been passed through a preheater, and the resultant preheated gas mixture is admitted to a reactor.

Figure V is a flow diagram illustrating a preferred process by which the reaction of the invention is conducted continuously, namely the method wherein silicochloroform is preheated and admitted to a reactor, and ethylene is admitted to the reactor at points spaced along the length of the reactor.

These specific drawings and the specific description that follows merely disclose and illustrate and are not intended to limit the scope of the invention.

Heretofore it has not been known to be possible to introduce more than one alkyl radical by reacting an olefin with a halosilane whose molecule contains only one hydrogen atom connected directly to the silicon atom. The present invention is based upon the discovery of a new reaction in which a silane having more than one alkyl radical in the molecule is formed from ethylene and silicochloroform. This reaction takes place in the absence of catalysts at temperatures of approximately 450° C. and higher. It may be possible to carry out the reaction at lower temperatures by subjecting the silicochloroform to prolonged heating at such temperatures before the ethylene is introduced.

In the present reaction, the actual formation of a silane having more than one alkyl radical in the molecule may be preceded by the formation of an intermediate such as dichlorosilane which reacts with the ethylene to give a dialkyldichlorosilane.

The failure of prior workers to discover the present reaction is believed to be due to the fact that the only products of the reaction of ethylene and silicochloroform at lower temperatures are monoalkylsilanes. Thus, when a mixture of ethylene and silicochloroform is heated, some of the ethylene is lost by polymerization, and the remainder of the ethylene is likely to be used up by the reaction which produces monoalkylsilanes, before a temperature is reached at which dialkylsilanes could be formed.

It has been discovered that the present reaction proceeds at lower temperatures and gives greater yields in the presence of a catalyst consisting of anhydrous aluminum chloride or anhydrous aluminum bromide. These catalysts would not have been expected to be usable in the present reaction because of their tendency to cause polymerization of ethylene, but it has been found that in spite of such tendency these catalysts give highly advantageous results when used in the present process.

In order to carry out the present reaction it is only necessary to get the reaction started before one of the reactants is completely used up by formation of monoalkylsilanes or by polymerization. Thus, the reactants should be brought to the reaction temperature without causing either of the reactants to be completely used up. The presence of anhydrous aluminum chloride or bromide is advantageous in causing the present reaction to take place at a lower temperature and in thus reducing the danger that one of the reactants will be used up before the present reaction begins.

In the practice of the present method, the reactants may be brought to the reaction temperature before one of the reactants is used up by passing the mixture of reactants rapidly through a narrow heating tube, as shown in Figure I. The presence of anhydrous aluminum chloride or bromide makes it possible to employ less rapid heating. In the presence of a sufficiently large proportion of the catalyst, for example an amount of anhydrous aluminum chloride equal to about 8 per cent of the weight of the silicochloroform, the reactants may be charged into a bomb together with the catalyst and heated slowly enough so that the bomb takes about three and one-half hours to attain a temperature of 300° C.

The preferred procedure consists in bringing the ethylene and silicochloroform together at the reaction temperature. Before being brought together at the reaction temperature, the ethylene and silicochloroform may be preheated separately, as shown in Figure IV. The temperature produced by mixing the ethylene and silicochloroform should be one at which the reaction takes place. The attainment of the reaction temperature when the ethylene and silicochloroform are brought together may be due not only to the sensible heat provided by the preheating of the reactants, but also to heat generated by the reaction of the ethylene and silicochloroform.

One of the best ways of carrying out the present reaction consists in bringing the ethylene and silicochloroform together at the reaction temperature by adding the ethylene gradually to the silicochloroform. When this is done the silicochloroform should be preheated substantially to the reaction temperature before the ethylene is introduced.

If the ethylene is added gradually to the silicochloroform, the catalyst, in the form of vapor or in the form of a mixture of the vapor with nitrogen, may be introduced gradually at the point at which the ethylene is being introduced. However, in any case in which the silicochloroform is preheated separately it is advantageous to mix the catalyst with the silicochloroform before the addition of the ethylene, and gradual introduction of the ethylene then reduces the loss of ethylene by polymerization. In some cases it may be advantageous to maintain the catalyst and silicochloroform at the reaction temperature for a few minutes before the addition of the ethylene. If for any reason the catalyst is mixed with the ethylene before the silicochloroform is added, the interval between the addition of the catalyst and the addition of the silicochloroform should be as short as possible in order to minimize polymerization of the ethylene.

Silanes prepared by the reaction of the invention have the general formula

in which each of the radicals R and R' is an alkyl radical, and each of the radicals A and A' is an alkyl radical or a chloro radical. The most important product of the reaction is diethyldichlorosilane. From the reaction products, in addition to the desired products just described, can be separated (e. g., by fractional distillation) silicochloroform, silicon tetrachloride and ethyltrichlorosilane. N-butyltrichlorosilane and n-hexyltrichlorosilane are sometimes recovered from the reaction products, and it is believed that further substituted compounds (for example, compounds in which R, R' and A are ethyl, or in which R is ethyl, R' is n-butyl and A and A' are chloro) are also formed during the course of the reaction. Unidentified high boiling compounds are also recovered; the hydrolyzable chlorine content of these high boiling compounds is sufficiently low that they are believed to be silane products having fewer than three chlorine atoms per silicon atom in the silane molecule. Diethyldichlorosilane is a particularly useful product of the reaction of the invention; this is true because its molecule contains only two hydrolyzable radicals so that its hydrolysis and subsequent condensation to a siloxane result in a cyclic or straight chain polymer. Thus it is useful as a modifying agent to limit cross-linking in the preparation of siloxane condensation products.

Both anhydrous aluminum chloride and anhydrous aluminum bromide catalyze the reaction of the invention. Aluminum chloride is the preferred catalyst because it is less expensive than aluminum bromide. Apparently, a given mol percentage (based on the silicochloroform charged) of aluminum chloride has approximately the same catalytic effect as the same mol percentage of aluminum bromide.

The reaction can be conducted simply by heating a mixture of silicochloroform, ethylene and (if desired) one of the specified catalysts to the reaction temperature (e. g., as a batch process in a bomb, or as a continuous operation by passing this mixture into a reaction zone and removing the products from the reaction zone), as shown in Figure I, allowing the reaction to proceed to substantial completion, cooling the reaction products and separating them by fractional distillation. When the reaction is conducted in this way, the presence of a catalyst is ordinarily necessary.

The reaction can also be conducted by adding ethylene to a reactor containing silicochloroform at the reaction temperature and (if desired) one of the specified catalysts (e. g., as a batch process in a bomb, or continuously by admitting ethylene to a reaction zone containing silicochloroform and catalyst and removing therefrom the reaction products; when the reaction is conducted in this way, provision may be made for maintaining an excess of silicochloroform in the reaction zone until the reaction is almost complete), cooling the reaction products and separating them by fractional distillation. Using this procedure, and heating the silicochloroform to a somewhat higher temperature, it is possible to conduct the reaction in the absence of any catalyst to produce poly-(alkyl-substituted) silanes.

When the reaction is conducted as a batch operation by heating the reactants together, the silicochloroform and the catalyst are introduced at room temperature into a steel high pressure bomb. The bomb is sealed, placed in a heating jacket and connected to a gas line which is a source for ethylene. Sufficient ethylene is introduced into the bomb so that the molal ratio of ethylene to silicochloroform is between 0.1:1 and 3:1, and the bomb is then heated at a reasonably rapid rate to reaction temperature. (Usually the heating is effected by constant energy input, but a constant heating rate may be employed if desired; close temperature control is not essential when the reaction is conducted batch-wise.)

When the reaction of the invention is conducted as a batch operation by a procedure that consists in heating a mixture of the reactants and the catalyst, it is desirable to use a comparatively large per cent of catalyst. (The terms "per cent" and "parts" as used herein to refer to quantities of material mean per cent and parts by weight, unless otherwise qualified. "Per cent of catalyst" is used to refer to per cent of catalyst based on the amount of silicochloroform present, unless otherwise indicated.) Both aluminum chloride and aluminum bromide catalyze the polymerization of ethylene, and large amounts of these materials may cause the reaction to proceed with almost explosive violence. Elevated temperatures also increase the rate of polymerization of ethylene. For these reasons polymerization of the ethylene interferes materially with the desired reaction when this procedure is used. Apparently, comparatively low temperatures favor the polymerization reaction because somewhat higher temperatures accelerate the desired reaction between ethylene and silicochloroform more than they accelerate the polymerization of the ethylene. Thus, it is usually desirable to heat the mixture of reactants to at least about 320° C. at a reasonably rapid rate, because the desired reaction apparently is favored above this temperature when a catalyst is present with the reactants. It is usually preferable to heat the mixture of reactants to at least about 340° C. in a reasonable time, and the most desirable minimum temperature is about 360° C. Ordinarily there is no reason for heating the reaction mixture to a temperature higher than about 450° C. when a catalyst is present. This temperature is high enough that no material increase in the yield of silane products is obtained by heating the bomb to a higher temperature. Although heating above this temperature has no apparent undesirable effect on the products or on the yield, there is no advantage in heating the bomb substantially above this temperature. Because heating to a higher temperature wastes heat energy and causes undue equipment deterioration, 450° C. is selected as the maximum practical temperature with a catalyst present. For the same reasons it usually is preferable to avoid heating the bomb above about 400° C., and the most desirable maximum temperature is about 375° C.

The heating rate should be reasonably fast, usually fast enough so that the temperature of the reactants is 300° C. in about one to about four hours after heating is started. Faster heating rates may be used, for example, flash heating. The results achieved by flash heating should approximate those (hereinafter described) which result when ethylene is admitted to a reactor containing silicochloroform at the reaction temperature and one of the specified catalysts. However, if such results are desired, it is preferable to use the latter procedure rather than flash heating. It is believed that poly-(alkyl-substituted) silanes can be produced by flash heating of the reactants in the absence of a catalyst. However, to accomplish this end it is necessary to use higher reaction temperatures than are set forth above because the initiation temperature for this reaction is higher in the absence of a catalyst. Thus, if it is desired to produce poly-(alkyl-substituted) silanes by flash heating, reaction temperatures between about 450° C. and about 600° C. should be used.

When the reactants are heated together at ordinary heating rates it is desirable to conduct the reaction in the presence of at least about 6 per cent of aluminum chloride. This is a sufficient amount of catalyst that the reaction produces an appreciable yield of poly-(alkyl-substituted) silanes. The word "yield" is used herein to mean per cent conversion of the silicochloroform charged to the desired product. It is usually preferable to conduct the reaction in the presence of at least about 7 per cent of aluminum chloride, and it is most desirable to conduct the reaction in the presence of about 8 per cent of aluminum chloride. Ordinarily there is no reason for conducting the reaction in the presence of more than about 20 per cent of aluminum chloride. This amount of catalyst is high enough that no material increase in the yield of silane products is obtained by using a higher percentage. Although conducting the reaction in the presence of a higher percentage of aluminum chloride has no apparent undesirable effect on the products or on the yield, there is no advantage in using a higher percentage; therefore, because using more catalyst is unnecessarily expensive, 20 per cent of aluminum chloride is selected as the maximum practical amount of catalyst. For the same reason it usually is preferable to conduct the reaction in the presence of not more than about 15 per cent of aluminum chloride, and the most desirable maximum amount of catalyst is about 10 per cent.

Because ethylene, one of the reactants, is a gas, it is desirable to conduct the reaction at superatmospheric pressure. As is noted below it is desirable to react ethylene with a silane reactant in molal ratios from about 0.1:1 to about 3:1. By conducting the reaction at superatmospheric pressure such molal ratios of reactants are accomplished without the use of extremely large equipment. It is desirable to avoid unduly high pressures, particularly in the presence of relatively large amounts of catalyst, to eliminate the danger of explosive polymerization of the ethylene. It is ordinarily not practical to conduct the reaction at pressures lower than about 400 pounds per square inch gauge at reaction temperatures, as a reasonable charge of silicochloroform exerts nearly such a pressure. It is ordinarily preferable to conduct the reaction so that the pressure at reaction temperatures is at least about 600 pounds per square inch gauge. It is ordinarily not advisable to conduct the reaction at pressures higher than about 2000 pounds per square inch gauge. Ordinarily it is preferable to conduct the reaction at pressures not greater than about 1800 pounds per square inch gauge. It is usually most desirable to conduct the reaction at pressures between about 800 and 1200 pounds per square inch gauge. Higher pressures can safely be used in the presence of a diluent such as nitrogen or excess silicochloroform. The use of nitrogen dilution is sometimes desirable, as it may result in an increased yield due to suppression of the polymerization of ethylene.

It is desirable in all instances to avoid the introduction of air, containing moisture, which hydrolyzes the silanes present in the reactor to produce hydrogen chloride.

As hereinbefore noted it is believed that competing reactions, i. e., the formation of poly-(alkyl-substituted) silanes and the addition polymerization of ethylene, take place simultaneously, each reaction tending to deplete the supply of ethylene in the bomb. Therefore, when the reactants are heated together, it is usually desirable to use at least 0.1 mol of ethylene per mol of silicochloroform. It is usually not desirable to use more than about 3 mols of ethylene per mol of silicochloroform, as the use of a larger proportion of ethylene results in undue polymerization and consequent waste of ethylene, and requires an extremely large reaction vessel to produce reasonable batches of desired products. It is usually economically desirable to use from about 0.5 to about 1.5 mols of ethylene per mol of silicochloroform. As hereinbefore described, the presence of a diluent such as nitrogen or excess silicochloroform decreases the tendency for ethylene to polymerize. Therefore, if the unreacted silicochloroform is recovered from the reaction products and recycled, it may be desirable in some cases to use comparatively low ratios of ethylene to silicochloroform to save ethylene and to increase the overall yield of desired products.

When the reaction is conducted as a continuous process by heating the mixture of reactants, the temperature of the reaction zone must be controlled in order to produce optimum yields of the desired silane products. Too low a temperature results in a negligible yield of desired silane products, whereas too high a temperature may cause undue equipment deterioration or merely may be economically undesirable because of unnecessary consumption of heat. As hereinbefore described, in a batch process at temperatures as low as about 320° C., the reaction takes place at such a rate that appreciable yields of silane products are recovered; and, in most instances, it is not practical to conduct the reaction at temperatures substantially above 450° C. The same considerations that govern the operating temperature ranges and the rates of heating when the reaction is conducted batch-wise govern the temperature ranges and rates of heating when the reaction is run continuously. Which one of the factors noted above determines the maximum practical temperature depends upon the molal ratio of ethylene to silicochloroform, the pressure at which the reaction is conducted, and the catalyst used.

Because both aluminum chloride and aluminum bromide exist in the vapor phase under the temperature-partial pressure conditions which prevail in the reaction zone during the course of the reaction it is necessary in a continuous process to provide some means of introducing the catalyst continuously into the reaction zone. The catalyst cannot, however, be added to the ethylene and silicochloroform before these reactants have been heated to such a temperature that the catalyst will remain in the vapor phase. Therefore, the ethylene and silicochloroform are preheated, in the absence of any catalyst, to a temperature at which the catalyst is a vapor, and some reaction between these compounds proceeds during this preheating. As a consequence the yields are intermediate between those which would be obtained if the reaction were conducted batch-wise at the same heating rate with no catalyst and those which would be obtained if the reaction were conducted batch-wise at the same heating rate in the presence of the amount of catalyst present in the reaction zone of the continuous apparatus. For this reason, and to minimize polymerization, the reactants should be preheated as rapidly as possible and the catalyst should be introduced as soon as the reactants have reached the minimum reaction temperature of about 320° C., as shown in Figure II.

When the reactants are heated together to the reaction temperature, the same considerations that govern the amount of catalyst used when the reaction is conducted batch-wise govern the amount of catalyst used when the reaction is conducted as a continuous process. Thus, any amount of aluminum chloride from about 6 to about 20 per cent may be used, and the preferred amount for use in a given application of the invention is that amount which produces the desired proportions of reaction products in the optimum yield.

The catalyst may be introduced into the stream of reactants by means of an injector, or it may be introduced into the stream of reactants with an inert gas carrier. If an inert gas carrier is used it is desirable that the gas be saturated with vaporous catalyst since the inert gas acts as a diluent and tends to decrease the rate of reaction. Dilution of the ethylene, however, has the advantage that the diluent decreases the rate of ethylene polymerization. The inert gas is saturated with vaporous catalyst by passing the gas through a heated vaporizer containing a bed of solid catalyst. The gas is passed through the vaporizer at a rate slow enough that substantial saturation is achieved. The inert gas and catalyst are then introduced into the reaction zone at such a rate that the desired ratio of catalyst to silicochloroform is maintained. The inert gas carrier that is used may be nitrogen, hydrogen, helium, neon, argon, krypton, xenon or carbon dioxide. It is advisable that a trap be inserted in the line between the catalyst vaporizer and the reaction zone in order that any entrained catalyst particles may be removed from the gas stream. Inasmuch as the catalyst bed is depleted as the process continues (with the result that the surface area of catalyst exposed to the gas stream is gradually decreased) it is desirable to provide an alternate or bypass catalyst vaporizer, as shown in Figure III so that the reaction may be maintained on a continuous basis by introducing the catalyst into the inert gas from the alternate or bypass catalyst vaporizer when one catalyst bed becomes appreciably depleted, and while this catalyst bed is being replenished.

The rate at which a catalyst is added to the reactants (by injection or with an inert gas carrier) is the same as that at which it is removed with the reaction products (changes in the per cent of catalyst may be effected by changing the rate of catalyst addition, or, while maintaining constant the rate of catalyst addition, by changing the rate at which reactants are added).

The time of contact between reactants and catalyst at reaction temperatures that results in substantial completion of the reaction is different for different amounts of catalyst. Using a molal ratio of ethylene to silicochloroform of about 1.6:1 the reaction is substantially complete (when conducted in the presence of 8.2 per cent of aluminum chloride) after about 230 minutes at reaction temperatures, when the reactants are heated by constant energy input to 300° C. at such a heating rate that this temperature is achieved in about 210 minutes, and heating (by the same constant energy input) is continued until the reaction is complete.

The same considerations that govern the proportions of reactants and the pressure used when the reaction is conducted as a batch operation govern the proportions of reactants and the pressure used when the reactants are heated together in a continuous operation. Thus, from about 0.1 to about 3 mols of ethylene should be introduced into the reaction zone per mol of silicochloroform, and it is usually preferable to introduce from about 0.5 to about 1.5 mols of ethylene into the reaction zone per mol of silicochloroform. It is practical to conduct the reaction at pressures between 400 pounds per square inch gauge and 2000 pounds per square inch gauge, but it is usually preferable to conduct the reaction at pressures between about 600 and about 1800 pounds per square inch gauge. The optimum pressure depends upon the other operating variables.

The preferred procedure for practicing the invention involves the addition of ethylene to silicochloroform, preferably in the presence of a catalyst. It is desirable that, before the ethylene is added, the silicochloroform be heated approximately to reaction temperature so that the desired reaction proceeds as soon as the ethylene is added. The reaction may be conducted in this way either continuously or as a batch operation.

The preferred procedure, consisting in heating the silicochloroform substantially to the reaction temperature before the ethylene is added, produces a remarkable improvement in yield as compared with the procedure of heating the reactants together. When the reactants are heated together in the absence of a catalyst they must be heated very rapidly to avoid conversion of all the silicochloroform to monoalkyltrichlorosilanes before attainment of a temperature at which the present reaction proceeds. On the other hand, when the reactants are heated together in the presence of a catalyst to lower the initiation temperature of the present reaction, the catalyst causes loss of ethylene by polymerization.

When the reaction is conducted in this way as a batch operation, silicochloroform and the desired percentage of one of the specified catalysts are introduced at room temperature into a steel high pressure bomb, and the bomb is sealed, placed in a heating jacket and connected to a gas line which is a source for ethylene. The bomb is heated to 270–450° C. (the heating rate is not important, although it is usually desirable to heat the bomb at a reasonably rapid rate so that this part of the operation is not unnecessarily prolonged). In some instances, as much as two hours may be used to heat the silicochloroform-catalyst mixture. Ethylene is then introduced into the bomb, causing the pressure to rise sharply. When the pressure once more drops ethylene is again added. This procedure is repeated until the ethylene addition is not followed by a marked drop in pressure. Ordinarily, from 1.5 to 2.5 mols of ethylene are added per mol of silicochloroform in the reactor.

It is believed that ethylene and silicochloroform undergo slowly, at comparatively low temperatures, the reaction which produces poly-(alkyl-substituted) silanes; however, it is usually not practical to conduct the reaction, even in the presence of a large amount of one of the specified catalysts, by bringing the ethylene and silicochloroform together at temperatures substantially below about 270° C. The reaction proceeds at a faster rate in the presence of one of the specified catalysts than it does at the same temperature in the absence of a catalyst; also, the reaction proceeds at a faster rate at a given temperature in the presence of a large amount of one of the catalysts than it does in the presence of a smaller amount. Thus, in conducting the reaction in the absence of any catalyst it is usually not practical to use a temperature less than about 450° C. It is practical to conduct the reaction at temperatures intermediate between 270° C. and 450° C. in the presence of intermediate amounts of catalyst.

Since it is advantageous to conduct the reaction in the presence of a catalyst, it is ordinarily preferable to make the ethylene addition when the temperature of the silicochloroform-catalyst mixture is at least about 300° C., and the most desirable minimum temperature is about 320° C. When the reaction is conducted in the presence of one of the specified catalysts it is ordinarily not desirable to heat the silicochloroform above about 450° C. This maximum temperature is high enough that no material increase in the yield of desired silanes is obtained by heating the mixture to a higher temperature. Although heating the mixture to a higher temperature has no apparent undesirable effect on the products or on the yield, there is no advantage in heating above this temperature; therefore, to avoid waste of heat energy and undue equipment deterioration, 450° C. is selected as the maximum practical temperature to which the mixture may be heated before addition of the ethylene. For the same reasons it is usually preferable to avoid heating the mixture above about 400° C., and the most desirable maximum temperature is about 375° C. Although it is advisable in all instances to conduct the reaction in the presence of one of the specified catalysts, when the reaction is conducted in the absence of any catalyst it is usually not desirable to heat the silicochloroform to a temperature higher than about 600° C. before adding the ethylene.

The reaction may be conducted by bringing the ethylene and silicochloroform together in the absence of any catalyst or in the presence of anhydrous aluminum chloride or anhydrous aluminum bromide in amounts varying from a mere trace (an amount which increases appreciably the yield of one or more of the desired products or reduces appreciably the minimum practical operating temperature), i. e., about 0.01 per cent, to an amount above which further increase is not warranted because any increased yield is more than offset by the increased catalyst cost (i. e., about 20 per cent).

A reasonable charge of silicochloroform exerts a pressure of about 400 pounds per square inch gauge at the minimum practical reaction temperature. Therefore, it is usually not practical to conduct the reaction as a batch process at pressures lower than about 400 pounds per square inch gauge. Pressure is not a critical variable when the reaction is conducted in this way, but it is usually preferable to add ethylene to the catalyst-silicochloroform mixture until the pressure is at least about 750 pounds per square inch gauge, and most desirably until the pressure is about 900 pounds per square inch gauge. It is ordinarily advisable to stop the ethylene addition before the pressure increases substantially above about 1200 pounds per square inch gauge because the exothermic reaction of the invention increases the temperature of the bomb soon after the ethylene is added, with the result that after the ethylene addition is complete the total pressure inside the bomb may rise substantially. It is ordinarily preferable to stop the ethylene addition before the pressure reaches about 1100 pounds per square inch gauge, and most desirably before the pressure reaches about 1000 pounds per square inch gauge.

By making several small additions of ethylene instead of one large addition, or by adding the ethylene at a very slow uniform rate, the mol fraction of ethylene present in the reactor is kept at a minimum throughout the course of the reaction so as to minimize polymerization. It is known that the rate of polymerization of ethylene is decreased substantially by comparatively slight dilution; excess silicochloroform, ethyltrichlorosilane, diethyldichlorosilane, and silicon tetrachloride, so far as the polymerization is concerned, are all diluents, and tend to suppress ethylene polymerization. Thus it is usually advisable to make the ethylene additions at a comparatively slow rate (i. e., about 0.01 mol of ethylene per minute per mol of silicochloroform). Rapid addition of the ethylene results in more polymerization of ethylene and is consequently wasteful, but there is no real limit on the speed of addition of the ethylene so long as it is not added at such a rate that explosive polymerization occurs. Satisfactory results are obtained by adding ethylene at a rate of about 0.1 mol per minute per mol of silicochloroform.

The amount of ethylene that is added may be as little as 0.1 mol per mol of silicochloroform or as high as 3 mols per mol of silicochloroform, but preferably is from about 0.5 to about 1.5 mols per mol of silicochloroform. It is believed that the reaction of the invention proceeds in the molal ratio of 1:1 when diethyldichlorosilane is the product, i. e., that two molecules of ethylene and two molecules of silicochloroform are consumed to form one molecule of diethyldichlorosilane; however, because some of the ethylene undergoes addition polymerization during the course of the reaction it is usually advisable to add a slight excess of ethylene over that theoretically required to react with all the silicochloroform. There is no advantage in using an excess of ethylene over that actually required to react with all the silicochloroform in the reactor, but if the silicochloroform is recovered and recycled it may be economically advantageous to add slightly less ethylene than is required to react with all the silicochloroform, to minimize polymerization of the ethylene. It is desirable that the ethylene added to the reactor be mixed rapidly with the silicochloroform (e. g., by agitation) to avoid local high concentrations of ethylene and consequent excessive polymerization.

When the reaction is conducted as a continuous process, using the method of adding ethylene to the heated silicochloroform or silicochloroform-catalyst mixture, the same general considerations govern the course of the reaction as when it is conducted as a batch operation by this method.

A silicochloroform-catalyst mixture is readily obtained in a vaporizer. By using a large vaporizer it is possible to control closely the silicochloroform-catalyst ratio because substantial equilibrium between the silicochloroform and the vaporizing catalyst can be obtained so that the silicochloroform-catalyst ratio is dependent only upon the temperature of the vaporizer. It is advisable to provide an alternate vaporizer so that continuous operation is possible, as shown in Figure III. Catalyst also can be added directly to the reactor by means of an injector or with an inert gas carrier as hereinbefore described, but the vaporizer method is preferred.

The silicochloroform-catalyst mixture may leave the vaporizer substantially at reaction temperature. It may be further preheated if necessary to the proper temperature and then admitted to the reaction zone. The rate at which this mixture is introduced into the reaction zone depends upon the size of the reactor, the rate of ethylene addition, the desired reaction time and the rate of product removal.

The considerations governing the temperature, the pressure and the amount of catalyst used are the same as those, hereinbefore described, governing the temperature, the pressure and the amount of catalyst used when the reaction is conducted as a batch process by bringing the ethylene and silicochloroform together at the reaction temperature.

When the reaction is conducted continuously by adding ethylene to silicochloroform or to a silicochloroform-catalyst mixture, at the reaction temperature, it is preferable to use a somewhat smaller molal ratio of ethylene to silicochloroform than when the reaction is conducted as a batch process by the same method. When the reaction is conducted as a batch process in this way the ethylene is added in several small portions over a considerable period of time. This allows the reaction to proceed at extremely low ethylene concentrations; when one portion of ethylene is consumed by the reaction more ethylene is added and this also reacts at extremely low ethylene concentrations. However, when the reaction is conducted continuously it is usually preferable to add ethylene continuously to the reaction zone. This results in higher concentrations of ethylene than does the batch process at a given ratio of reactants. It is possible to add ethylene intermittently, or simultaneously at successive points along the length of the reactor as shown in Figure V, in conducting the reaction continuously, but longer contact times are required to conduct the reaction by such a method. Since unnecessarily expensive means are required for making intermittent additions, continuous addition of ethylene is ordinarily preferable to intermittent addition for economic reasons. Ethylene and silicochloroform can be reacted by this method in molal ratios as low as 0.1:1, but it is usually preferable to use a molal ratio of ethylene to silicochloroform between about 0.5:1 and about 1.3:1. If it is desired to add ethylene intermittently to the silicochloroform or silicochloroform-catalyst mixture, it is usually preferable to use a molal ratio of ethylene to silicochloroform between about 0.5:1 and about 1.5:1. Using intermittent ethylene addition it is practical to use a molal ratio of ethylene to silicochloroform as high as 3:1, but, using continuous ethylene addition it is usually not desirable to use a molal ratio greater than about 2:1.

*Example 1*

A vapor phase reaction between ethylene and silicochloroform is used to produce a silane having more than one alkyl radical in the molecule, for example, diethyldichlorosilane, according to the following procedure:

Silicochloroform (110 grams) and aluminum chloride (6.6 grams) are charged into a steel high pressure bomb having a capacity of about 1100 ml., and the bomb is sealed, placed in a heating jacket and connected to a gas line that is attached to an ethylene source. Ethylene is admitted into the bomb until the pressure is 525 pounds per square inch gauge at 25° C., and the bomb is then heated, using a constant energy input sufficient to attain a temperature of 300° C. in about 80 minutes. Heating is continued (by the same constant energy input) for about an additional 101 minutes, after which the temperature is about 396° C. and the reaction is considered to be approximately complete. The pressure inside the reactor reaches a maximum of about 900 pounds per square inch gauge when the temperature is 288° C. Heating is discontinued; the bomb is allowed to cool; and the product is removed from the bomb and separated by fractional distillation through a jacketed column 18 inches in length and 18 millimeters in diameter, packed with glass helices. The total product recovered consists of 8 grams of volatile materials, 55 grams of forerun, 23 grams of ethyltrichlorosilane, a trace of diethyldichlorosilane and 20 grams of residue. The temperature of the water used for cooling the condenser is not low enough to condense a quantity of volatile materials, comprising silicon tetrachloride and silicochloroform, which is recovered in a dry ice trap following the condenser, and is reported above as "volatile materials." At the beginning of fractional distillation of the reaction products the material in the still is heated slowly until the temperature at the top of the column reaches approximately the boiling point of the most volatile alkylsilane present (e. g., ethyltrichlorosilane). The material which is collected in the condenser during this heating process is weighed, and is designated as "forerun." The forerun consists substantially of silicochloroform and silicon tetrachloride, but includes also some alkylsilanes. The composition of each alkylsilane reaction product is checked by determining per cent of chlorine.

The procedure of the preceding paragraph is repeated for purposes of comparison using 5.5 grams of aluminum chloride instead of 6.6 grams. No poly-(alkyl-substituted) silane is detected in the reaction product.

Example 2

The procedure of the first paragraph of Example 1 is repeated using 7.7 grams of aluminum chloride. The bomb is heated, using a constant energy input sufficient to attain a temperature of 300° C. in about 85 minutes. Heating is continued (by the same constant energy input) for about an additional 150 minutes, after which the temperature is about 400° C. and the reaction is considered to be approximately complete. The pressure inside the reactor reaches a maximum of about 900 pounds per square inch gauge when the temperature is 272° C. The total product consists of 50 grams of volatile materials including loss during distillation, 52 grams of forerun, 18 grams of ethyltrichlorosilane, a trace of diethyldichlorosilane and 20 grams of residue.

Example 3

The procedure of the first paragraph of Example 1 is repeated using 9.0 grams of aluminum chloride, and adding ethylene until the pressure is 530 pounds per square inch gauge at 25° C. The bomb is heated, using a constant energy input sufficient to attain a temperature of 300° C. in about 208 minutes. Heating is continued (by the same constant energy input) for about an additional 228 minutes, after which the temperature is about 373° C. and the reaction is considered to be approximately complete. The pressure inside the reactor reaches a maximum of about 1095 pounds per square inch gauge when the temperature is 112° C. The total silane product recovered by fractional distillation consists of 20 grams of volatile materials, 65 grams of forerun, a trace of ethyltrichlorosilane, 18 grams of diethyldichlorosilane and 40 grams of residue. This corresponds to a 28.4 per cent conversion of the silicochloroform charged to diethyldichlorosilane, plus a trace of ethyltrichlorosilane.

Example 4

A better yield of a silane having more than one alkyl radical in the molecule, for example, diethyldichlorosilane, is produced by a vapor phase reaction between ethylene and silicochloroform according to the following procedure:

Silicochloroform (139) grams) and aluminum chloride (9.0 grams) are charged into a steel high pressure bomb having a capacity of about 1100 ml., and the bomb is sealed, placed in a heating jacket and connected to a gas line that is attached to an ethylene source. The bomb is heated to about 300° C. (the heating rate is not important, but it is ordinarily preferable, for practical reasons, to heat the bomb at a reasonably rapid rate, e. g., at such a rate that the temperature reaches the desired range in from about 1 to about 3 hours).

At a temperature of 300° C. the pressure inside the bomb is about 600 pounds per square inch gauge. The bomb is maintained at a temperature of about 300° C. for about 10 minutes, after which time ethylene is introduced rapidly into the bomb until the pressure is about 1050 pounds per square inch gauge. (This ethylene addition is made over the course of about 3 minutes.) Exothermic reaction inside the bomb causes the temperature to rise to about 344° C. Reaction inside the bomb decreases the total number of mols of ethylene and, consequently, the pressure, so that about 5 minutes after the ethylene addition the pressure has dropped to about 650 pounds per square inch gauge. When the temperature has dropped to about 315° C. ethylene is once more added until the pressure is about 1050 pounds per square inch gauge. After this ethylene addition the temperature rises to about 330° C. and, about 20 minutes after the ethylene is added, the pressure is about 650 pounds per square inch gauge. Ethylene is again added to a pressure of 1050 pounds per square inch gauge. Reaction is allowed to proceed for about an hour during which time the temperature of the bomb is maintained between about 310° C. and about 320° C. At the end of this hour the pressure is about 900 pounds per square inch gauge; the reaction is considered to be approximately complete; heating is discontinued; the bomb is allowed to cool; and the product is removed from the bomb and separated by fractional distillation through a jacketed column 18 inches in length and 18 millimeters in diameter, packed with glass helices. The total product recovered consists of 39 grams of forerun (which includes 13 grams of silicon tetrachloride), 49 grams of ethyltrichlorosilane, 15 grams of diethyldichlorosilane, 14 grams of n-butyltrichlorosilane, 24 grams of unidentified silanes and 16 grams of residue. This corresponds to 30.0, 19.1, 7.3 and 4.3 per cent conversions of the silicochloroform charged to ethyltrichlorosilane, diethyldichlorosilane, n-butyltrichlorosilane and unidentified silane calculated as hexyltrichlorosilane, respectively.

Example 5

The procedure of Example 4 is repeated using 110 grams of silicochloroform and 9.0 grams of aluminum chloride. The ethylene addition is begun at a very slow rate (i. e., about 0.01 mol of ethylene per minute per mol of silicochloroform) when the temperature of the silicochloroform and aluminum chloride is about 300° C. During the addition of ethylene at this slow rate the exothermic reaction inside the bomb does not generate sufficient heat to maintain the temperature in the desired range; therefore, the bomb is heated sufficiently to maintain its temperature between about 300° C. and about 320° C. until the ethylene additions are complete. The reaction is considered to be approximately complete about 360 minutes after the ethylene additions are started, when about 1 mol of ethylene has been added to the bomb by intermittent addition at about the specified rate. The total product recovered by fractional distillation consists of 49 grams of forerun (which includes 24 grams of silicochloroform), 17.5 grams of ethyltrichlorosilane, 22.5 grams of diethyldichlorosilane and 13 grams of residue. This corresponds to 13.2 and 35.4 per cent conversions of the silicochloroform charged to ethyltrichlorosilane and diethyldichlorosilane, respectively.

Example 6

The procedure of Example 4 is repeated using 135.5 grams of silicochloroform and 4.1 grams of aluminum chloride. The addition of ethylene is begun when the temperature of the silicochloroform and aluminum chloride is about 320° C. Ethylene is introduced rapidly into the bomb until the pressure is about 1080 pounds per square inch gauge. Exothermic reaction inside the bomb causes the temperature to rise to about 358° C. About 15 minutes after the first ethylene addition the temperature has dropped to about 320° C. When the pressure has decreased to about 780 pounds per square inch gauge, ethylene is again added until the pressure is about 1080 pounds per square inch gauge. After about an additional 15 minutes (during which time the temperature is maintained at about 320° C. by gentle heating) the pressure has dropped to about 925 pounds per square inch gauge, and ethylene is once more added to a pressure of 1080 pounds per square inch gauge. Gentle heating is continued in order to maintain the temperature of the reactants at about 320° C., and, after about an additional 5 minutes (during which time the pressure has dropped to about 950 pounds per square inch gauge), ethylene is again added to a pressure of about 1080 pounds per square inch gauge. The temperature of the reactor is maintained at about 320° C. for about 75 minutes after this last ethylene addition. The pressure is then about 700 pounds per square inch gauge, and ethylene is once more introduced into the bomb until the pressure is about 1080 pounds per square inch gauge. The bomb is maintained at a temperature of about 320° C. for an additional 10 minutes, and at the end of this time the pressure in the reactor is about 1050 pounds per square inch gauge, and the reaction is considered to be approximately complete. The total product recovered by fractional distillation consists of 7 grams of volatile materials, 53 grams of forerun (which includes 10 grams of silicon tetrachloride), 44.5 grams of ethyltrichlorosilane, 14 grams of diethyldichlorosilane, 22 grams of n-butyltrichlorosilane and 12.5 grams of n-hexyltrichlorosilane. This corresponds to 27.2, 17.8, 11.5 and 5.7 per cent conversions of the silicochloroform charged to ethyltrichlorosilane, diethyldichlorosilane, n-butyltrichlorosilane and n-hexyltrichlorosilane, respectively.

Example 7

The procedure of Example 4 is repeated using 135.5 grams of silicochloroform and 2.7 grams of aluminum chloride. The addition of ethylene is begun at a very slow rate (i. e., about 0.01 mol of ethylene per minute per mol of silicochloroform) when the temperature of the silicochloroform and aluminum chloride is about 320° C. During the addition of ethylene at this slow rate the exothermic reaction inside the bomb does not generate sufficient heat to maintain the temperature in the desired range; therefore, the bomb is heated sufficiently to maintain its temperature between about 310° C. and about 330° C. while ethylene is added intermittently at about the rate stated above. The reaction is considered to be approximately complete about 165 minutes after the additions of ethylene are started, when about 2.0 mols of ethylene have been added to the bomb by intermittent addition at about the specified rate. The total product recovered by fractional distillation consists of 14 grams of volatile materials, 40 grams of forerun (which includes 10 grams of silicon tetrachloride), 58.5 grams of ethyltrichlorosilane, 10 grams of diethyldichlorosilane, 22 grams of n-butyltrichlorosilane and 11 grams of n-hexyltrichlorosilane. This corresponds to 35.7, 12.7, 11.8 and 5.0 per cent conversions of the silicochloroform charged to ethyltrichlorosilane, diethyldichlorosilane, n-butyltrichlorosilane and n-hexyltrichlorosilane, respectively.

Example 8

The procedure of Example 4 is repeated using 135.5 grams of silicochloroform and 1.4 grams of aluminum chloride. The addition of ethylene is begun at a very slow rate (i. e., about 0.01 mol of ethylene per minute per mol of silicochloroform) when the temperature of the silicochloroform and aluminum chloride is about 407° C. Exothermic reaction inside the bomb causes the temperature to rise to about 440° C. About 15 minutes after the first addition of ethylene the temperature has dropped to about 392° C.; ethylene is once more introduced at about the same rate; and the bomb is heated gently during the rest of the reaction so that its temperature is maintained between about 400° C. and about 420° C. Ethylene is added continuously at slightly less than the specified rate for about the last 140 minutes of the reaction, which is considered to be approximately complete about 170 minutes after the first addition of ethylene. In all, about 1.5 mols of ethylene are added to the bomb. The total product recovered by fractional distillation consists of 5 grams of volatile materials, 48 grams of forerun (which includes 23 grams of silicon tetrachloride), 62.5 grams of ethyltrichlorosilane, 10 grams of diethyldichlorosilane, 15 grams of n-butyltrichlorosilane and 15 grams of residue. This corresponds to 38.3, 12.7 and 7.8 per cent conversions of the silicochloroform charged to ethyltrichlorosilane, diethyldichlorosilane and n-butyltrichlorosilane, respectively.

Example 9

The procedure of Example 4 is repeated using 135.5 grams of silicochloroform and no aluminum chloride. The addition of ethylene is begun at a very slow rate (i. e., about 0.01 mol of ethylene per minute per mol of silicochloroform) when the temperature of the silicochloroform is about 440° C. The temperature of the bomb is maintained between about 440° C. and about 460° C. for about 120 minutes during which time ethylene is introduced continuously at about the specified rate; after this time the reaction is considered to be approximately complete. The total product recovered by fractional distillation consists of 5 grams of volatile materials, 49 grams of forerun (which includes 25 grams of silicon tetrachloride), 69 grams of ethyltrichlorosilane, 5 grams of diethyldichlorosilane, 12 grams of n-butyltrichlorosilane and 10 grams of residue. This corresponds to 42.3, 6 and 6.3 per cent conversions of the silicochloroform charged to ethyltrichlorosilane, diethyldichlorosilane and n-butyltrichlorosilane, respectively.

Results similar to those achieved in the preceding examples are obtained using equimolecular amounts of anhydrous aluminum bromide in place of the anhydrous aluminum chloride.

*Example 10*

The procedure of Example 4 is repeated using 135.5 grams of silicochloroform and, in place of the aluminum chloride, 10.8 grams of aluminum bromide. The addition of ethylene is begun when the temperature of the silicochloroform and aluminum bromide is about 347° C. Ethylene is introduced rapidly into the bomb until the pressure is about 900 pounds per square inch gauge. Exothermic reaction inside the bomb causes the temperature to rise. About 5 minutes after the first ethylene addition the pressure has decreased to about 800 pounds per square inch gauge and ethylene is again added until the pressure is about 900 pounds per square inch gauge. After about an additional 5 minutes the temperature inside the bomb reaches a maximum of about 367° C.; at this time the pressure has once more decreased to about 800 pounds per square inch gauge, and ethylene is once more added until the pressure is about 900 pounds per square inch gauge. Thereafter the pressure inside the bomb is maintained between about 850 pounds per square inch gauge and about 900 pounds per square inch gauge by adding ethylene whenever the pressure falls as low as about 850 pounds per square inch gauge, while the bomb is heated so as to maintain the temperature between about 320° C. and about 340° C., until about 40 minutes after the first addition of ethylene, when the reaction is considered to be substantially complete. The total product recovered by fractional distillation consists of 44 grams of forerun (which includes 7.7 grams of silicon tetrachloride), 48 gram of ethyltrichlorosilane, 14 grams of diethyldichlorosilane and 30 grams of residue. This corresponds to 29 and 20 per cent conversions of the silicochloroform charged to ethyltrichlorosilane and diethyldichlorosilane, respectively. Volatile materials and distillation losses account for 18.2 grams of the reaction products.

Where results herein are presented as per cent yield (which means, as hereinbefore described, per cent conversions of the silicochloroform charged), this is a conservative estimate of the efficiency of the reaction. The forerun, which is not considered in determining the yield, contains substantial amounts of silicochloroform, as it includes all material which distills from the reaction products at temperatures below the boiling point of ethyltrichlorosilane. The silicochloroform can be separated from the forerun and recycled; additional silicochloroform need be used only to replace that converted to silane products or lost in the course of reaction. Therefore, more silane products are recovered per pound of silicochloroform consumed than the figures reported indicate.

Having described the invention, I claim:

1. A method of producing silanes that comprises forming a silane having more than one alkyl radical in the molecule by reacting ethylene with silicochloroform in the presence of a catalyst of the class consisting of anhydrous aluminum chloride and anhydrous aluminum bromide, the temperature of the reaction mixture being at least 300° C. within four hours after heating of the reaction mixture is started.

2. A method of producing silanes that comprises forming diethyldichlorosilane by reacting ethylene with silicochloroform in the presence of anhydrous aluminum chloride, the temperature of the reaction mixture being at least 300° C. within four hours after heating of the reaction mixture is started.

3. A method of producing silanes that comprises forming a silane having more than one alkyl radical in the molecule by bringing together ethylene and silicochloroform at a temperature of at least 270° C. in the presence of a catalyst of the class consisting of anhydrous aluminum chloride and anhydrous aluminum bromide, the temperature of the reaction mixture being at least 300° C. within four hours after the ethylene and silicochloroform are first brought together.

4. A method as claimed in claim 3 in which the ethylene is added gradually to the silicochloroform.

DAVID B. HATCHER.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |

FOREIGN PATENTS

| Number | Country | Date |
|---|---|---|
| 44,934 | Russia | Nov. 20, 1935 |

OTHER REFERENCES

Barry, "Jour. Am. Chem. Soc.," vol. 69 (1947), page 2916.